United States Patent
Ions et al.

(10) Patent No.: US 11,658,540 B2
(45) Date of Patent: May 23, 2023

(54) ASSEMBLING METHOD OF A ROTOR TO AN ELECTRIC MOTOR FRAME

(71) Applicant: Dyson Technology Limited, Wiltshire (GB)

(72) Inventors: David Ions, Swindon (GB); John Declan Stott, Bristol (GB); Thomas Richard Stafford, Bath (GB)

(73) Assignee: Dyson Technology Limited, Malmesbury (GB)

( * ) Notice: Subject to any disclaimer, the term of this patent is extended or adjusted under 35 U.S.C. 154(b) by 312 days.

(21) Appl. No.: 16/976,787

(22) PCT Filed: Feb. 19, 2019

(86) PCT No.: PCT/GB2019/050450
§ 371 (c)(1),
(2) Date: Aug. 31, 2020

(87) PCT Pub. No.: WO2019/166777
PCT Pub. Date: Sep. 6, 2019

(65) Prior Publication Data
US 2021/0083545 A1    Mar. 18, 2021

(30) Foreign Application Priority Data
Mar. 1, 2018   (GB) .................................... 1803350

(51) Int. Cl.
*H02K 9/16*    (2006.01)
*H02K 5/16*    (2006.01)
*H02K 15/02*   (2006.01)

(52) U.S. Cl.
CPC ............ *H02K 5/16* (2013.01); *H02K 15/02* (2013.01)

(58) Field of Classification Search
CPC .................................. H02K 5/16; H02K 15/02
USPC ............................................................ 310/90
See application file for complete search history.

(56) References Cited

U.S. PATENT DOCUMENTS

| 3,451,736 A | 6/1969 | Riccio |
| 4,810,108 A | 3/1989 | Yajima |
| 4,969,754 A | 11/1990 | Rohrer et al. |
| 7,088,023 B1 | 8/2006 | Gomyo et al. |

(Continued)

FOREIGN PATENT DOCUMENTS

| CH | 368345 A | 5/1963 |
| CN | 101153633 A | 4/2008 |

(Continued)

OTHER PUBLICATIONS

Office Action received for Korean Patent Application No. 10-2020-7025892, dated Jul. 13, 2022, 14 pages (7 pages of English Translation and 7 pages of Original Document).

(Continued)

*Primary Examiner* — Terrance L Kenerly
(74) *Attorney, Agent, or Firm* — Faegre Drinker Biddle & Reath LLP

(57) ABSTRACT

A method of mounting a rotor assembly to a frame of an electric motor includes providing a rotor assembly having a bearing and a frame having a bearing seat. The method includes locating the bearing within the bearing seat, applying a first adhesive at a substantially hidden interface between the bearing and the bearing seat, applying a second adhesive at a substantially visible interface between the bearing and the bearing seat, and curing the first and second adhesives using different curing processes.

18 Claims, 11 Drawing Sheets

(56) References Cited

U.S. PATENT DOCUMENTS

| | | |
|---|---|---|
| 2003/0012472 A1 | 1/2003 | Pilone et al. |
| 2008/0080090 A1 | 4/2008 | Gomyo et al. |
| 2009/0160277 A1 | 6/2009 | Obara |
| 2009/0195095 A1 | 8/2009 | Yawata et al. |
| 2010/0181875 A1 | 7/2010 | Tamaoka et al. |
| 2010/0187932 A1 | 7/2010 | Kawai et al. |
| 2011/0044810 A1 | 2/2011 | Ions |
| 2013/0192743 A1 | 8/2013 | Wohlfeil et al. |
| 2014/0328684 A1 | 11/2014 | King et al. |
| 2015/0228300 A1 | 8/2015 | Sugi et al. |
| 2021/0006121 A1 | 1/2021 | Ions |
| 2021/0013765 A1 | 1/2021 | Ions |

FOREIGN PATENT DOCUMENTS

| | | |
|---|---|---|
| CN | 102361363 A | 2/2012 |
| CN | 105864106 A | 8/2016 |
| DE | 2021915 A1 | 11/1971 |
| DE | 3101596 A1 | 8/1982 |
| DE | 3137981 A1 | 4/1983 |
| EP | 2562426 A2 | 2/2013 |
| EP | 3151385 A1 | 4/2017 |
| GB | 894894 A | 4/1962 |
| GB | 2114685 A | 8/1983 |
| GB | 2467969 A | 8/2010 |
| GB | 2493973 A | 2/2013 |
| GB | 2493974 A | 2/2013 |
| GB | 2513663 A | 11/2014 |
| GB | 2513664 A | 11/2014 |
| JP | S47-15845 U | 10/1972 |
| JP | S50-20044 U | 3/1975 |
| JP | S50-59450 U | 6/1975 |
| JP | S53-12939 U | 2/1978 |
| JP | S57-83720 A | 5/1982 |
| JP | H2-188699 A | 7/1990 |
| JP | H9-4643 A | 1/1997 |
| JP | 2000-82252 A | 3/2000 |
| JP | 2000-249141 A | 9/2000 |
| JP | 2003-294050 A | 10/2003 |
| JP | 2007-143206 A | 6/2007 |
| JP | 2008-199764 A | 8/2008 |
| JP | 4645879 B2 | 3/2011 |
| JP | 4706922 B2 | 6/2011 |
| JP | 2013-204602 A | 10/2013 |
| JP | 2014-142071 A | 8/2014 |
| WO | 2010/097609 A1 | 9/2010 |
| WO | 2017/098204 A1 | 6/2017 |

OTHER PUBLICATIONS

Office Action received for Chinese Patent Application No. 201980016009.2, dated Jul. 20, 2022, 18 pages (9 pages of English Translation and 9 pages of Original Document).

International Search Report and Written Opinion dated Jun. 6, 2019, directed to International Application No. PCT/GB2019/050450; 18 pages.

Search Report dated Jul. 18, 2018, directed to GB Application No. 1803350.6; 1 page.

ASSEMBLING METHOD OF A ROTOR TO AN ELECTRIC MOTOR FRAME

REFERENCE TO RELATED APPLICATIONS

This application is a national stage application under 35 USC 371 of International Application No. PCT/GB2019/050450, filed Feb. 19, 2019, which claims the priority of United Kingdom Application No. 1803350.6, filed Mar. 1, 2018, the entire contents of each of which are incorporated herein by reference.

FIELD OF THE DISCLOSURE

The present disclosure relates to a method of mounting a rotor assembly to a frame of an electric motor, and to an electric motor.

BACKGROUND OF THE DISCLOSURE

There is a general desire to improve electric machines, such as brushless electric motors, in a number of ways. In particular, improvements may be desired in terms of size, weight, manufacturing cost, efficiency, reliability and noise.

SUMMARY OF THE DISCLOSURE

According to a first aspect of the present invention there is provided a method of mounting a rotor assembly to a frame of an electric motor, the method comprising providing a rotor assembly having a bearing, providing a frame having a bearing seat, locating the bearing within the bearing seat, applying a first adhesive at a hidden interface between the bearing and the bearing seat, applying a second adhesive at a visible interface between the bearing and the bearing seat, and curing the first and second adhesives using different curing processes.

According to a second aspect of the present invention there is provided an electric motor comprising a rotor assembly having a bearing, and a frame having a bearing seat for receiving the bearing, wherein the bearing is mounted to the bearing seat by a first adhesive at a hidden interface between the bearing and the bearing seat and by a second adhesive at a visible interface between the bearing and the bearing seat, the first and second adhesives having been cured using different curing processes.

The method according to the first aspect of the present invention, and the electric motor according to the second aspect of the present invention, may be beneficial principally as the first adhesive is largely hidden by the bearing seat. This may inhibit the use of certain types of curing process to cure the first adhesive, for example ultra-violet (UV) curing processes, as there is no way to guarantee that all of the first adhesive will be reached by UV light, and hence fully cure.

It is therefore necessary to use alternative processes for curing the first adhesive, such as, for example, heat curing processes. However, heat curing processes may take significantly longer than UV curing processes. This may result in a window in which the rotor assembly is not securely held in position relative to the frame, and in which misalignment of the rotor assembly relative to the frame may occur. Correct alignment of the rotor assembly and the frame is vital to reliable operation of the electric motor.

By applying a second adhesive to a visible interface between the bearing and the bearing seat, the second adhesive may fix the bearing to the bearing seat quickly, using a limited strength bond, thereby limiting the opportunity for misalignment of the rotor assembly and frame during manufacture. As the second adhesive is applied to a visible interface between the bearing and the bearing seat, the second adhesive may be visible following application, and hence a quick curing process, for example a UV curing process, may be used to secure the position of the rotor assembly relative to the frame whilst the main bond formed by the first adhesive is allowed to cure.

Furthermore, locating the bearing within the bearing seat prior to location of the first and second adhesives may allow for a cleaner application of the adhesives, and may reduce the risk of the adhesives contaminating other components during application, compared to, for example, applying the adhesives pre-location of the bearing in the bearing seat.

It will be appreciated by a person skilled in the art that at least a portion of the bearing may be visible through the aperture, and that the term substantially hidden interface should be interpreted accordingly.

The bearing seat may comprise an aperture through which the first adhesive is injected, for example through which the first adhesive is injected to the hidden interface. Applying the first adhesive may comprise injecting the first adhesive through the aperture to the hidden interface. This may be beneficial as the aperture may allow for the application of the first adhesive between the bearing and the bearing seat post-location of the bearing within the bearing seat. This may allow for a cleaner application of the first adhesive, and may reduce the risk of the first adhesive contaminating other components during application, compared to, for example, applying the first adhesive pre-location of the bearing in the bearing seat.

The method may comprise curing the first adhesive subsequent to curing the second adhesive. This may be beneficial as the second adhesive is applied to a visible interface, whereas the first adhesive is injected to a hidden interface. In particular, as the first adhesive is located at a hidden interface, it may prove difficult to utilise certain types of curing process to cure the first adhesive, for example ultra-violet (UV) curing processes, as there is no way to guarantee that all of the first adhesive will be reached by UV light, and hence fully cure.

It is therefore necessary to use alternative processes for curing the first adhesive, such as, for example, heat curing processes. However, heat curing processes may take significantly longer than UV curing processes. This may result in a window in which the rotor assembly is not securely held in position relative to the frame, and in which misalignment of the rotor assembly relative to the frame may occur. Alignment of the rotor assembly and the frame is vital to reliable operation of the electric motor.

As the second adhesive is located at a visible interface between the bearing and the bearing seat, it may be possible to cure the second adhesive using a quicker curing process than the curing process needed to cure the first adhesive, for example it may be possible to utilise a UV curing process for the second adhesive. Thus by curing the second adhesive prior to curing the first adhesive it may be possible to form a quick, relatively low strength, bond between the bearing and the bearing seat, thereby inhibiting misalignment of the bearing and the bearing seat during the longer curing process needed to cure the first adhesive.

The bearing and/or an internal surface of the bearing seat may comprise a first annular groove, and, for example, the first annular groove may define at least a portion of the hidden interface. Applying the first adhesive may comprise applying the first adhesive in the first annular groove. This may be beneficial as utilising the first annular groove may reduce the chance that the first adhesive will flow out from between the bearing and the bearing seat in an uncontrolled manner during application of the first adhesive. If the first adhesive is able to flow at the interface between the bearing and the bearing seat in an uncontrolled manner, there is the chance that the first adhesive may enter into the bearing itself, which may be extremely detrimental to the bearing and may stop the bearing from functioning completely. The first annular groove may also provide a mechanical key for adhesive to bond onto, and may increase the strength of the bond formed between the bearing and the bearing seat.

The first adhesive may comprise a different adhesive to the second adhesive. The second adhesive may comprise an adhesive having a shorter cure time than that of the first adhesive. This may be beneficial as the first adhesive may allow for the formation of a strong bond between the bearing and the bearing seat, whilst the second adhesive may form a quick bond to prevent misalignment of the bearing and bearing seat during the longer curing process of the first adhesive.

The first adhesive may comprise a heat cured adhesive, and may, for example, comprise a structural adhesive. Curing the first adhesive may comprise using a heat curing process. This may be beneficial as the first adhesive may be substantially hidden by the bearing seat after application of the first adhesive. It may therefore be difficult to completely cure the first adhesive using some curing processes, for example UV curing processes, as it may be difficult for the adhesive to be reached by UV light. Use of a heat cured adhesive and/or a heat curing process for curing the first adhesive may enable the first adhesive to be fully cured, thereby providing a strong and reliable bond.

The second adhesive may comprise a UV cured adhesive. Curing the second adhesive may comprise using a UV curing process. This may be beneficial as UV cured adhesives may have a relatively short curing time. This may enable the quick formation of a tacking bond between the bearing and the bearing seat whilst the first adhesive undergoes its curing process. In such a manner the relative alignment of the rotor assembly and the frame may be maintained during mounting of the rotor assembly to the frame.

The bearing seat may comprise a cut-out, for example such that at least a portion of the bearing is visible through the cut-out. The cut-out may define the visible interface between the bearing and the bearing seat.

The bearing may comprise a second groove, and at least a portion of the second groove may be exposed through the cut-out. Applying the second adhesive may comprise applying the second adhesive such that the second adhesive contacts the second groove and at least a portion of the external surface of the bearing seat in a region of the cut-out. This may be beneficial as the second groove may provide a mechanical key for the second adhesive to engage, thereby ensuring that the second adhesive is able to form a sufficiently strong bond to inhibit misalignment of the rotor assembly and the frame during curing of the first adhesive.

The method may comprise affecting relative movement between the bearing and the bearing seat prior to applying the second adhesive, and subsequent to applying the first adhesive. This may be beneficial as by affecting relative movement between the bearing and the bearing seat the adhesive can be spread along the interface between the bearing and the bearing seat, thereby increasing the total bond surface area, which may provide a stronger bond. Furthermore, the relative movement may be carefully controlled, thereby ensuring that the adhesive is only spread by a desired amount. This may reduce the risk of adhesive leaking at the interface. Such leakage may increase the risk of adhesive entering into the bearing itself, which may be extremely detrimental to the bearing and may stop the bearing from functioning completely.

The bearing may be substantially cylindrical in form, and may, for example, comprise two circular planar surfaces spaced apart by a curved surface. The at least a portion of the bearing exposed by the cut-out may comprise at least a portion of a curved surface of the bearing. The bearing seat may comprise a hollow substantially cylindrical collar. The cut-out may be disposed on a curved surface of the bearing seat. The cut-out may be substantially semi-circular in form.

The cut-out may expose no more than 20% of the total curved surface area of the bearing. This may be beneficial as exposing too much of the bearing may inhibit the formation of a secure bond between the bearing and the bearing seat, and may impact upon reliability of the electric motor.

At least a portion of the bearing seat may extend through substantially 360° about the curved surface of the bearing. This may be beneficial as at least a portion of the bearing seat may extend about substantially the entire circumference of the bearing, and may allow for even distribution of adhesive about the curved surface of the bearing, thereby allowing for the formation of a strong and/or even bond.

The aperture may be spaced apart from the cut-out, for example circumferentially and/or axially spaced apart from the cut-out along the bearing seat. This may be beneficial as this may separate two potential points of structural weakness of the bearing seat, and may ensure the structural integrity of the bearing seat.

It will be recognised that preferential features of aspects of the invention may be equally applied to other aspects of the present invention, where appropriate.

BRIEF DESCRIPTION OF THE FIGURES

In order to better understand the present invention according to various aspects, and to show more clearly how various aspects of the invention may be put into effect, the invention according to various aspects will now be described, by way of example, with reference to the following drawings.

DETAILED DESCRIPTION OF THE DISCLOSURE

Figure 1:
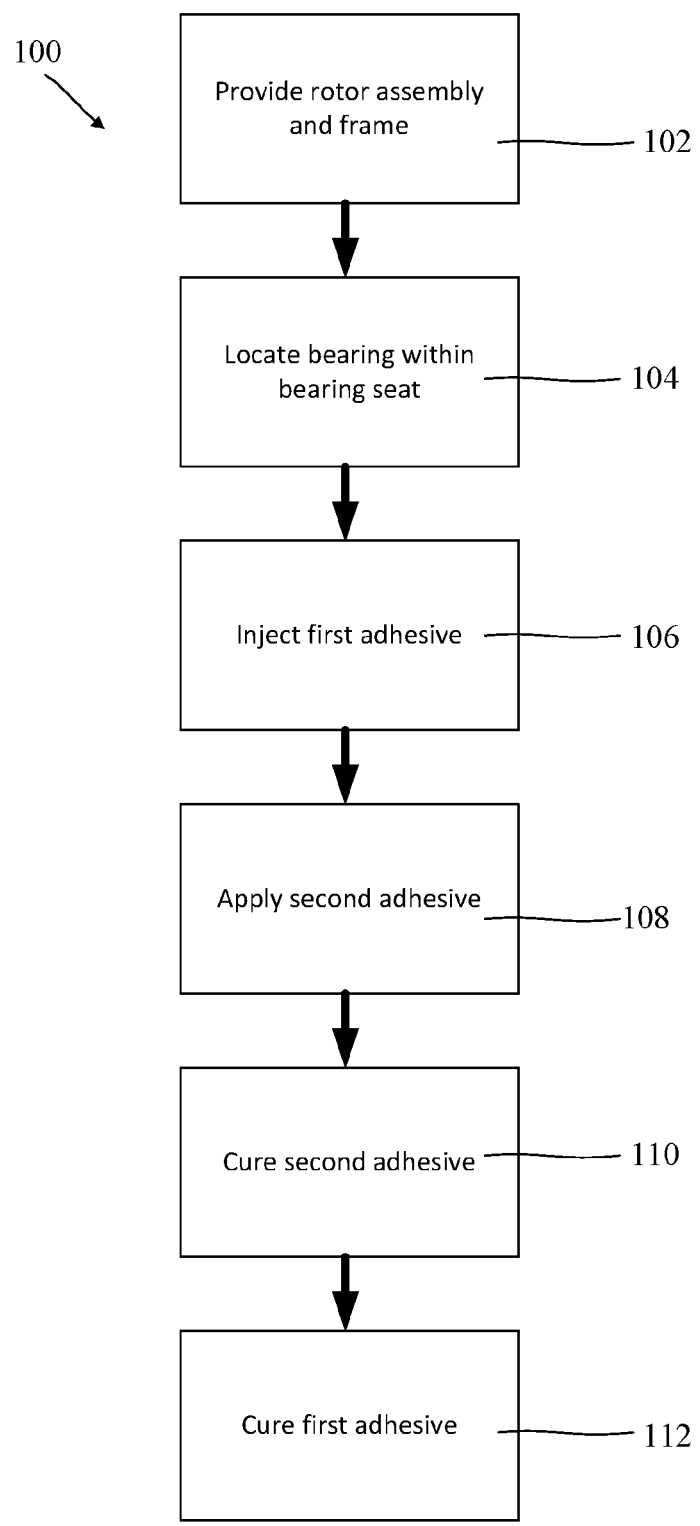
FIG. 1 is a block diagram of a first embodiment of a method of mounting a rotor assembly to a frame of an electric motor according to a first aspect of the present invention.
Figure 2:
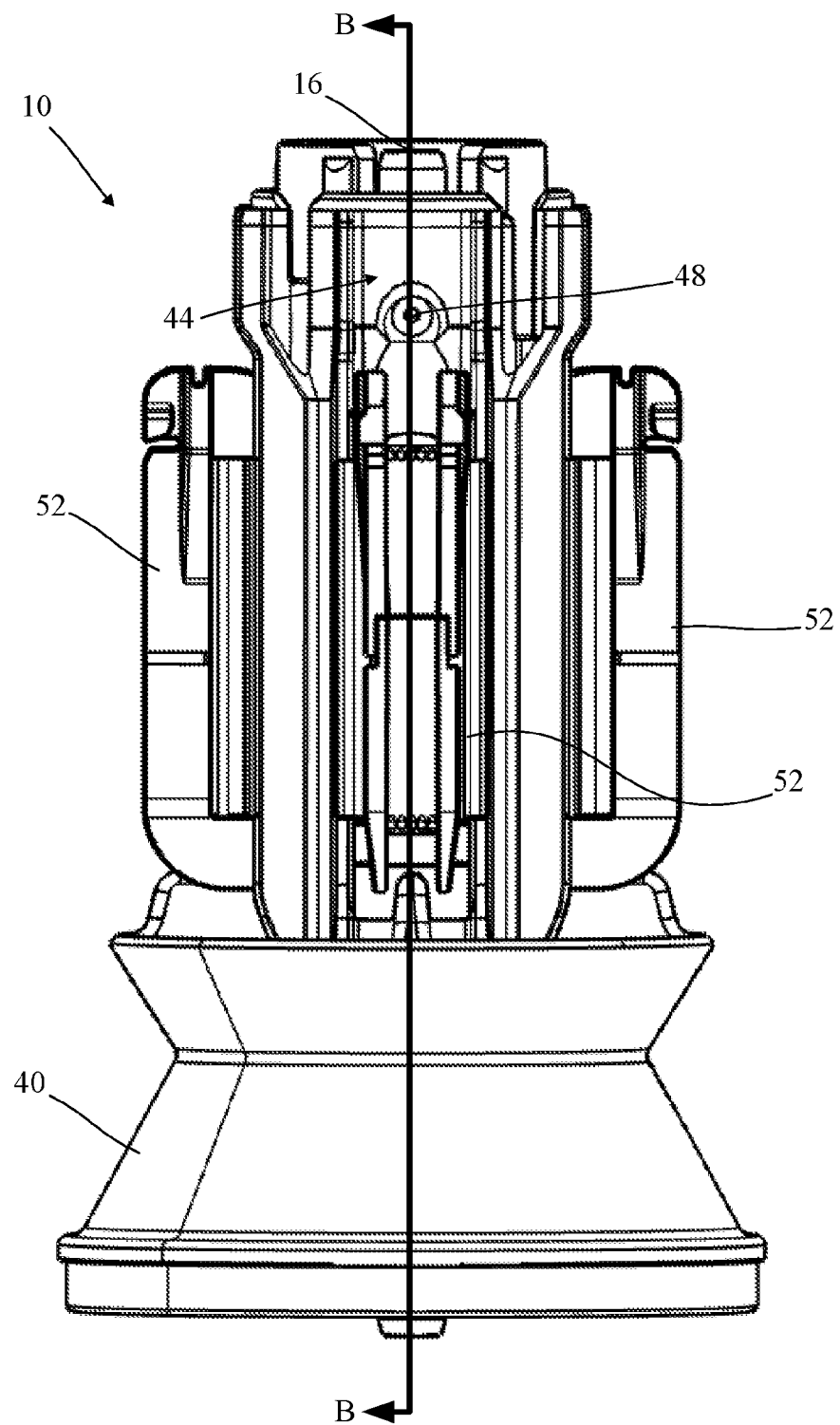
FIG. 2 is a front view of an electric motor according to a first aspect of the present invention.
Figure 3:
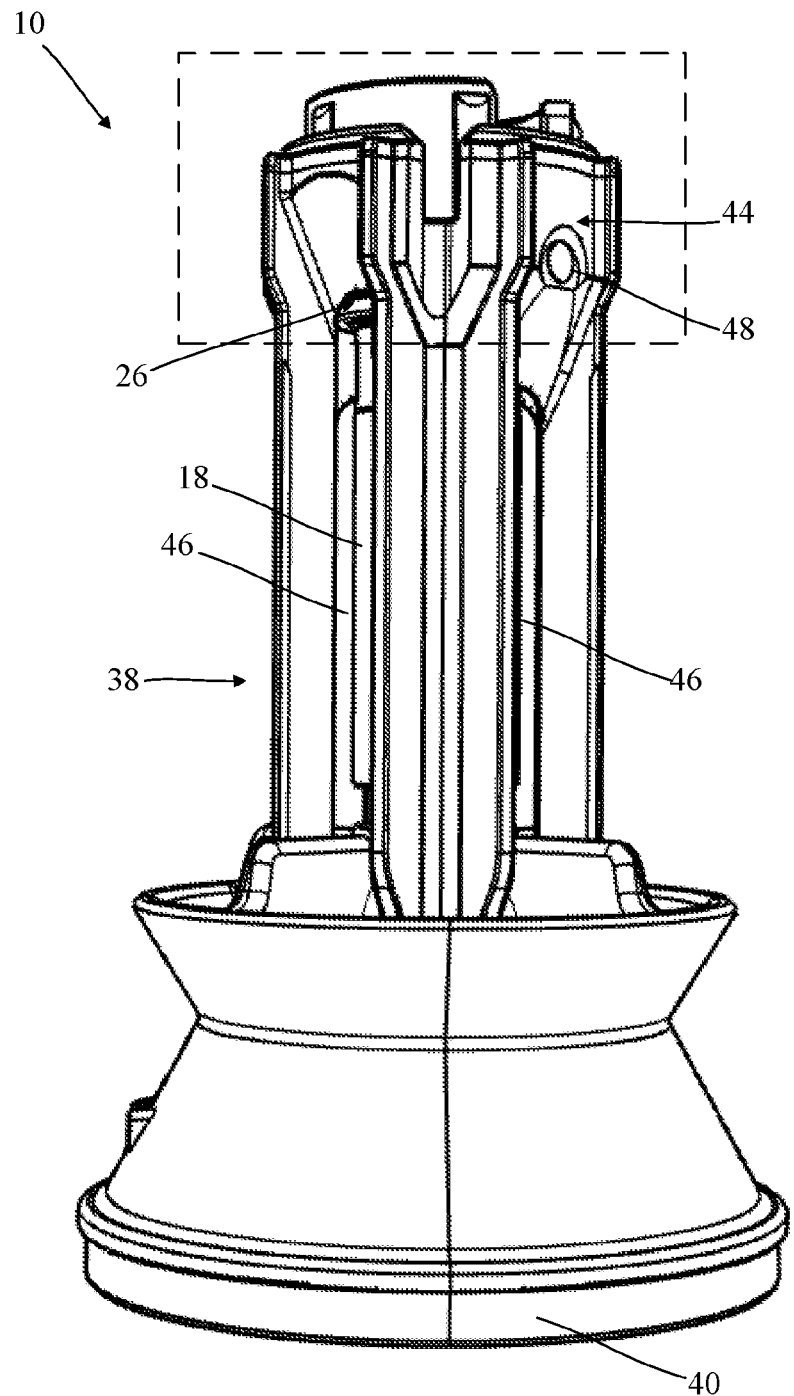
FIG. 3 is a perspective view of the electric motor of FIG. 2 with its stator core assemblies removed.

A first embodiment of a method, generally designated 100, of mounting a rotor assembly 12 to a frame 14 of an electric motor 10, is shown in the block diagram of FIG. 1.

The method 100 comprises an initial step 102 of providing a rotor assembly 12 having a bearing 26 and a frame 14 having a bearing seat 44. A suitable rotor assembly 12 is shown in isolation in FIG. 6, whilst a suitable frame 14 is shown in isolation in FIG. 7.

The rotor assembly 12 comprises a shaft 16 on which is mounted a rotor core permanent magnet 18, a first balancing ring 20, a second balancing ring 22, and first 24 and second 26 bearings mounted on the shaft 16 on either side of the rotor core permanent magnet 18 and balancing rings 20, 22. An impeller 28 is mounted at one end of the shaft 16, and a sensor magnet 30 is mounted at the other end.

Figure 6:
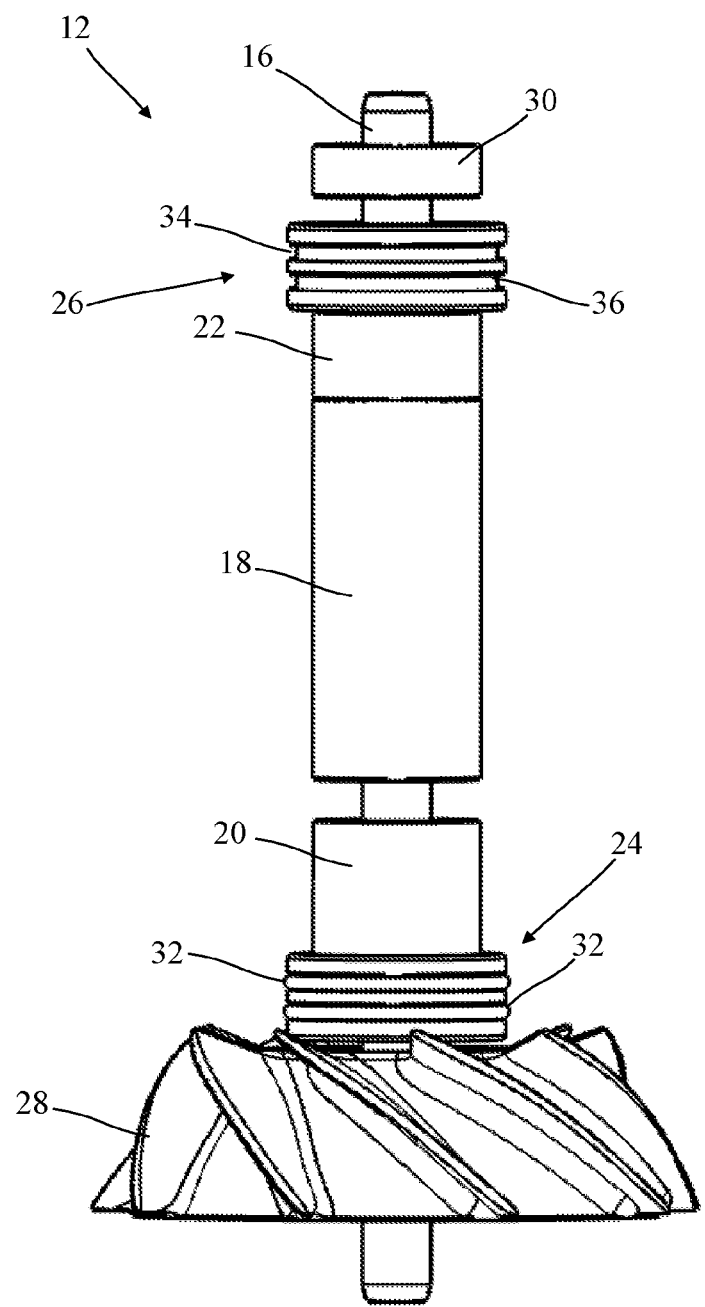
FIG. 6 is a front view of the rotor assembly of the electric motor of FIG. 2.
Figure 7:
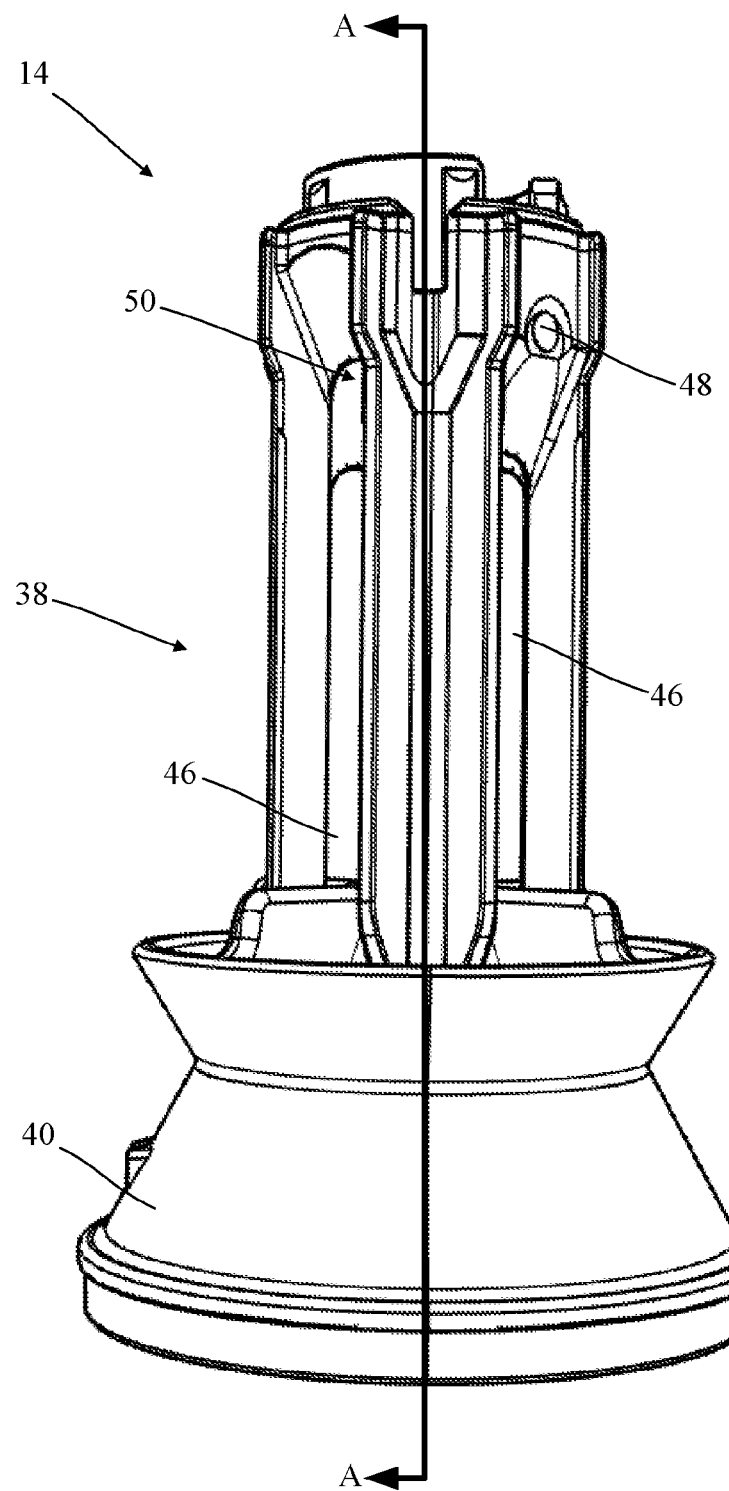
FIG. 7 is a perspective view of the frame of the electric motor of FIG. 2.

Although not shown in FIG. 6, the first bearing 24 is provided with annular grooves on the outer circumferential surface thereof. O-rings 32 sit within the annular grooves in order that the O-rings 32 remain in a desired position on the first bearing 24 and will not move around. When the rotor assembly 12 is mounted within the frame 14, the first bearing 24 sits inside a first bearing seat 42 in the frame 14, and is soft mounted thereto by way of the O-rings 32.

The second bearing 26 comprises first 34 and second 36 annular grooves formed on the outer circumferential surface thereof. The first annular groove 34 provides a channel in which a first adhesive 35 can be located, as will be described in more detail hereafter. In a similar manner, the second annular groove 36 also provides a channel in which a second/tacking adhesive 37 can be located.

The frame 14 is a one-piece construction, for example moulded as a single object, and comprises a generally cylindrical main body 38, and an impeller shroud 40 for covering the impeller 28 of the rotor assembly 12.

The main body 38 comprises a first bearing seat 42 formed at an end closest to the impeller shroud 40, and a second bearing seat 44 formed at the opposing end of the main body 38, furthest away from the impeller shroud 40. Each bearing seat 42,44 comprises an annular collar for receiving a corresponding bearing 24,26 therein. Four slots 46 extend longitudinally along the main body 38 between the first 42 and second 44 bearing seats, with the slots 46 being equally spaced about the circumference of the main body 38. The slots 46 are shaped and dimensioned to receive corresponding stator core assemblies 52 of the electric motor 10.

The second bearing seat 44 comprises an aperture 48 and a cut-out 50. The aperture 48 extends through the second bearing seat 44 to form an adhesive channel therethrough, and is shaped and dimensioned to receive an appropriate adhesive injection nozzle. The diameter of the aperture 48 is substantially equal to the width of the first annular groove 34 of the second bearing 26. The aperture 48 is substantially aligned with a central axis of one of the slots 46.

Figure 4:
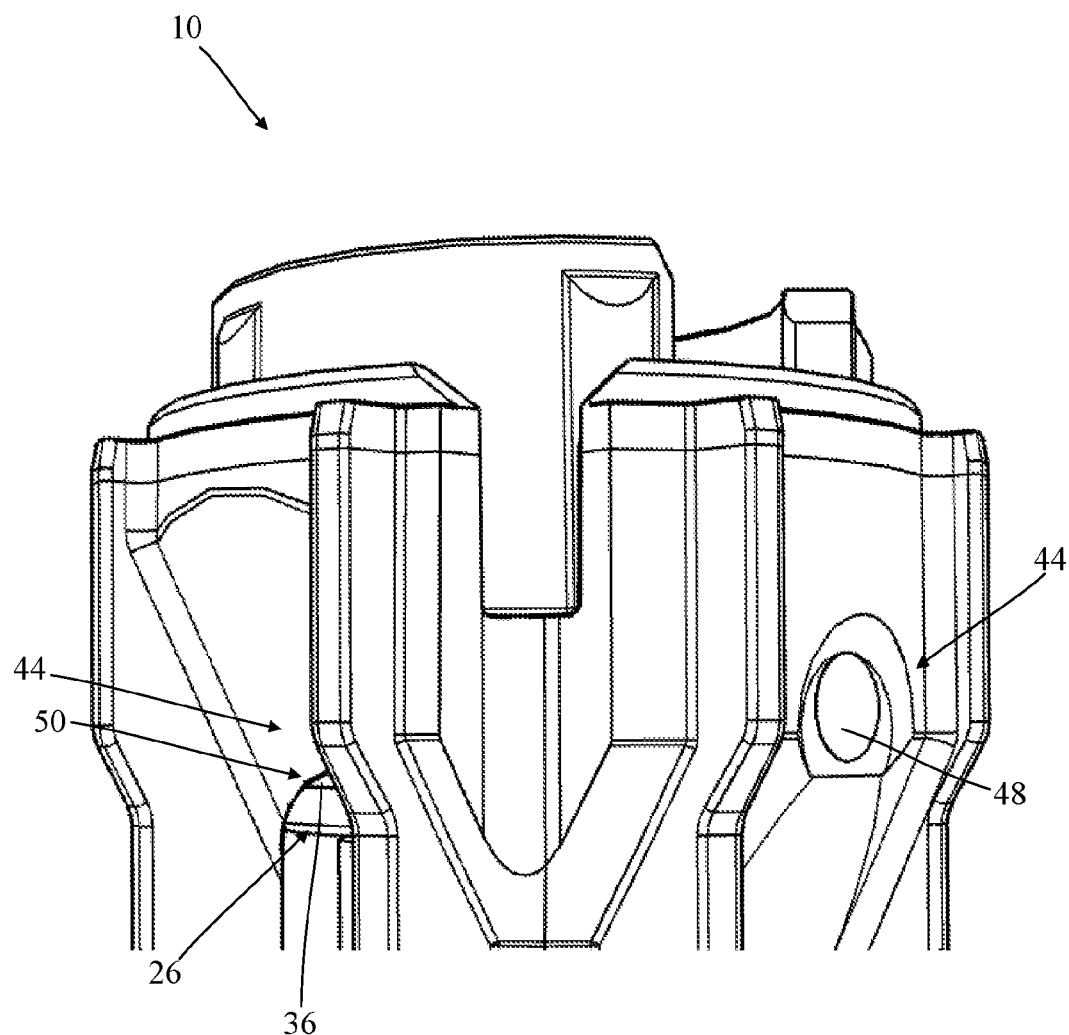
FIG. 4 is an enlarged view of the dashed region of FIG. 3.
Figure 5:
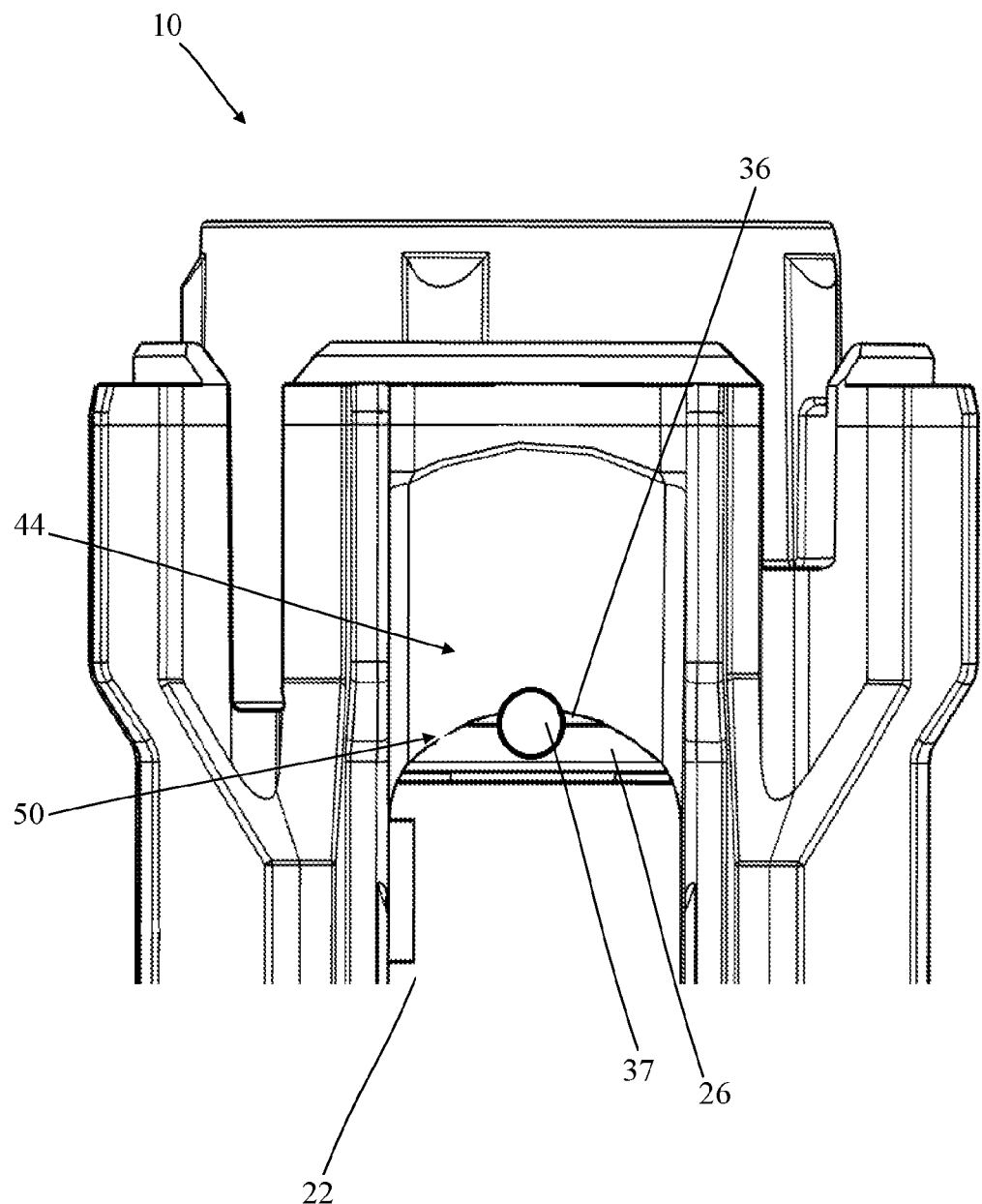
FIG. 5 is a rotated view of FIG. 4.
Figure 8:
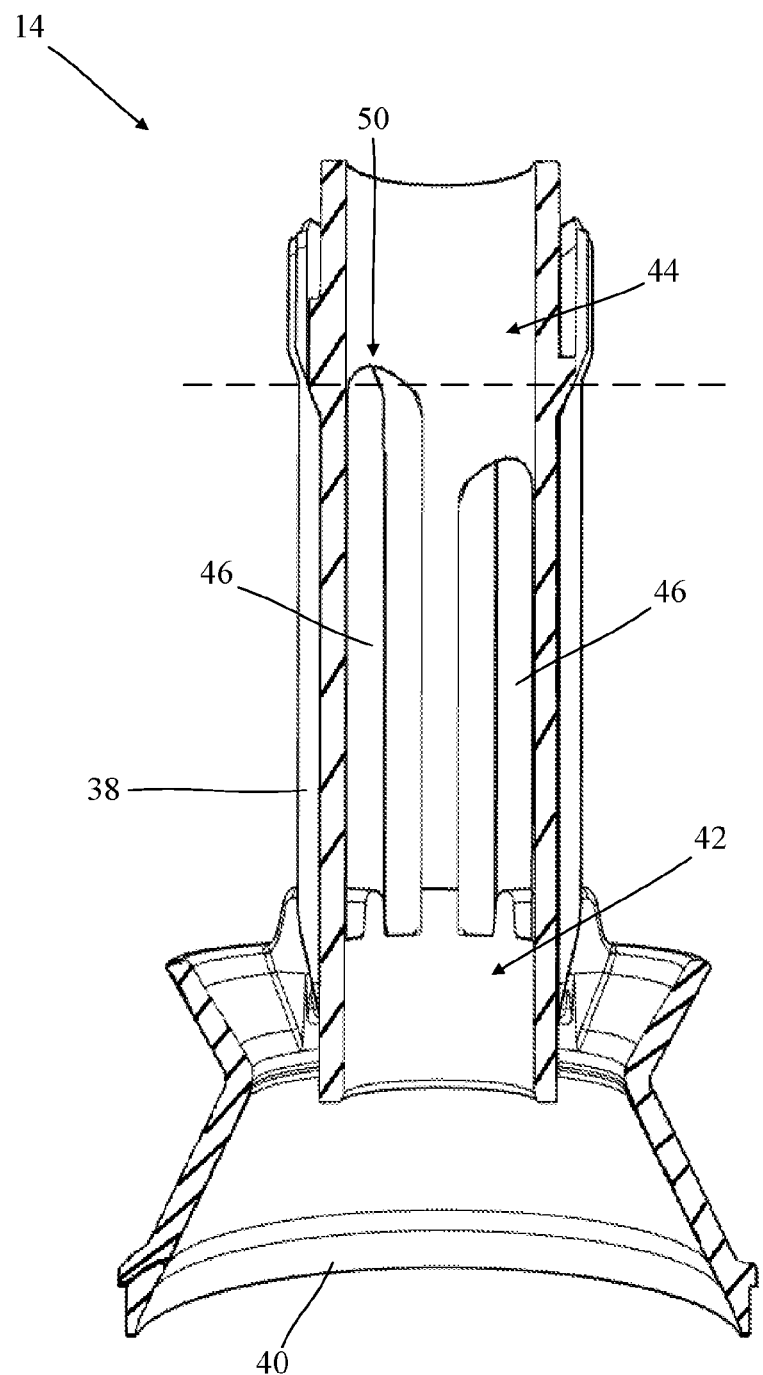
FIG. 8 is a sectional view taken along the line A-A of FIG. 7.
Figure 9:
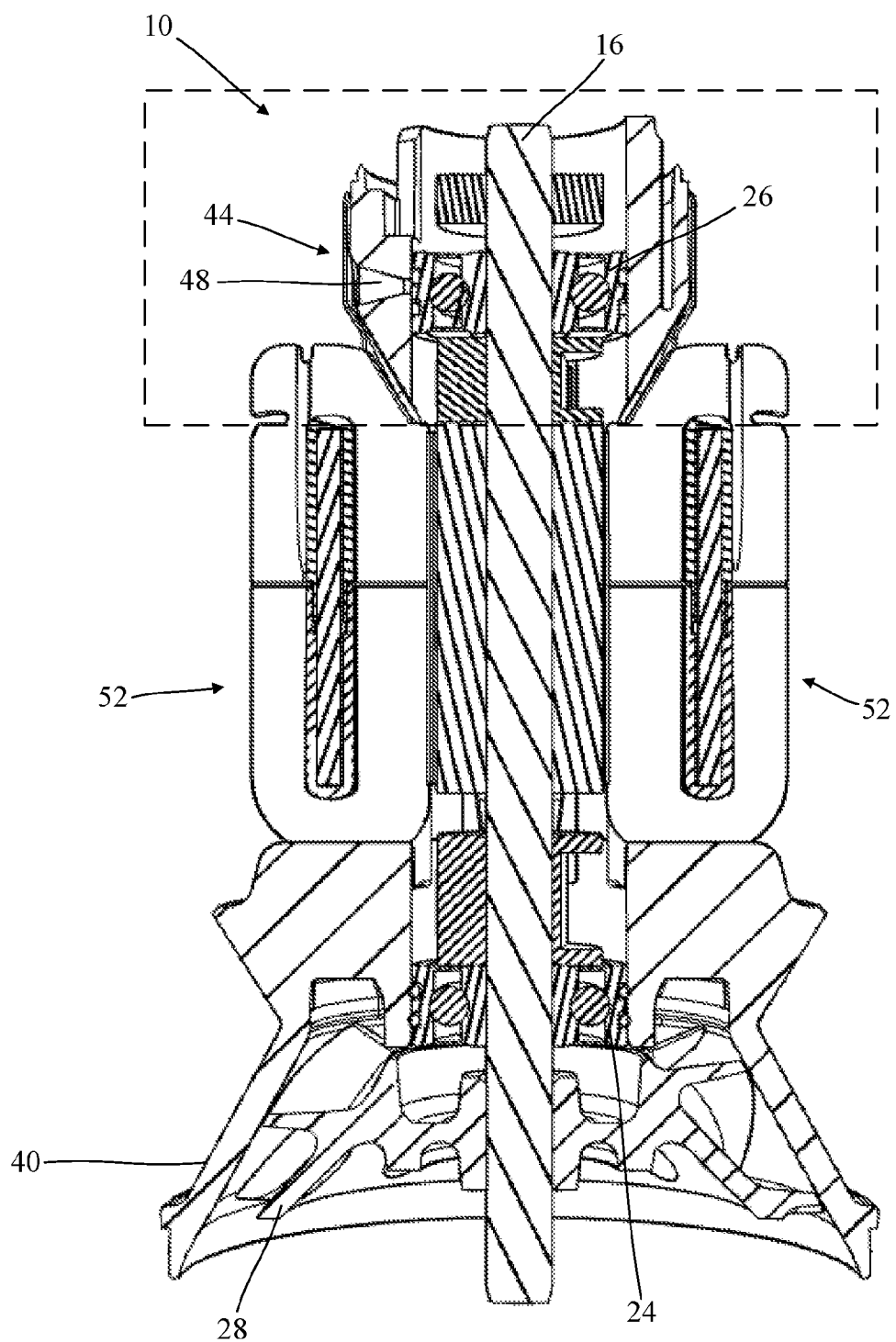
FIG. 9 is a sectional view taken along the line B-B of FIG. 2.
Figure 10:
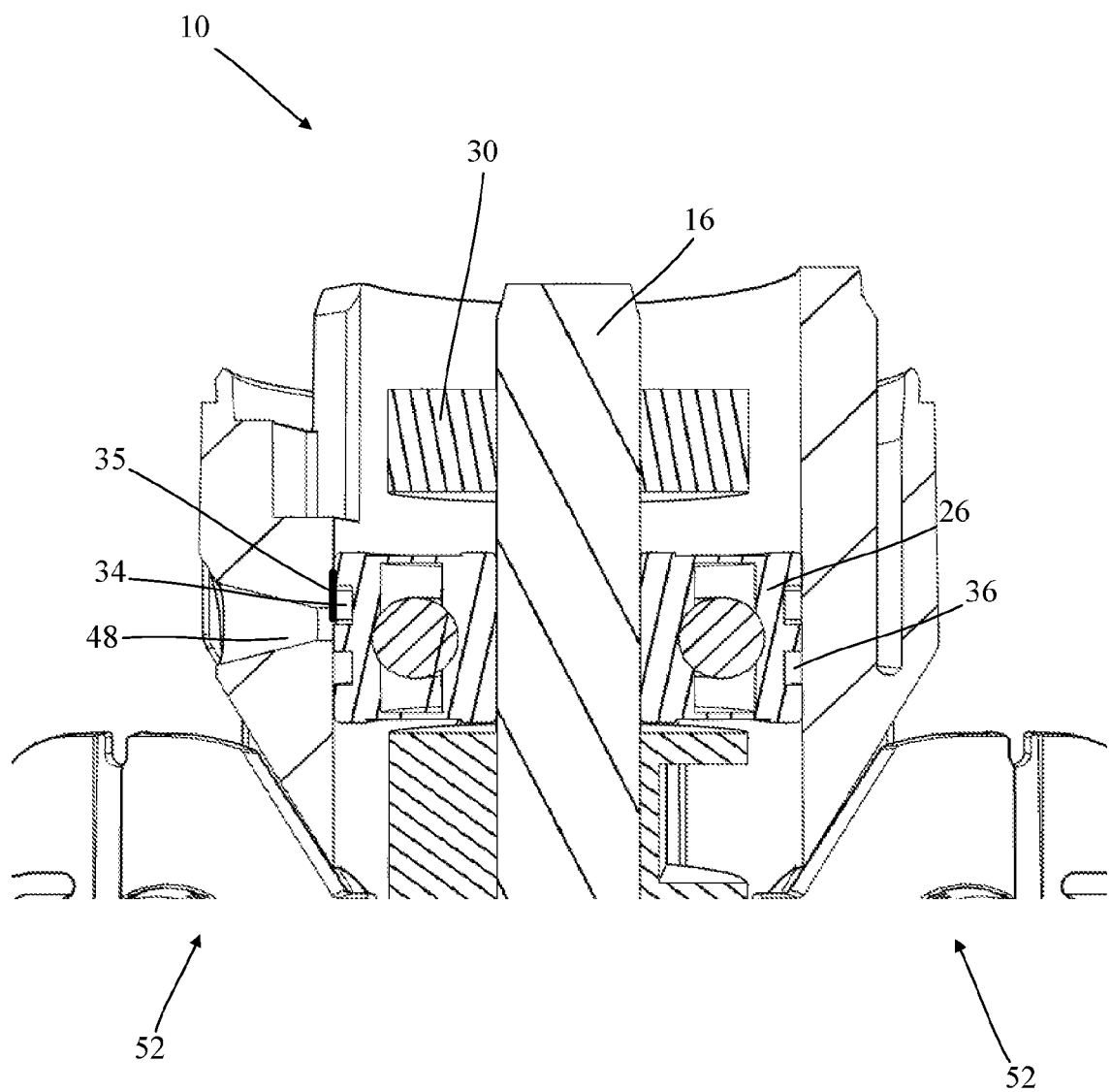
FIG. 10 is an enlarged view of the dashed region of FIG. 9.

The cut-out 50 is formed in a region of the second bearing seat 44 closest to one of the slots 46, and is effectively an extension of one of the slots 46 into the second bearing seat 44. The dashed line in FIG. 8 indicates roughly where the lowermost edge of the second bearing 26 lies in relation to the second bearing seat 44 when the rotor assembly 12 is mounted to the frame 14. As can be seen from FIGS. 4, 5 and 8, the second bearing 26 is thus located within the second bearing seat 44 such that the cut-out 50 exposes the second annular groove 36 of the second bearing 26 when the rotor assembly 12 is mounted to the frame 14. The cut-out 50 is disposed about 90° around the circumference of the main body 38 from the aperture 48.

Returning to the first embodiment of the method 100, the method 100 comprises locating 104 the second bearing 26 within the second bearing seat 44. The second bearing 26 is located within the second bearing seat 44 such that the first annular groove 34 of the second bearing 26 is substantially aligned with the aperture 48 of the second bearing seat 44. Thus an interface, ie a hidden interface, is formed between the second bearing 26 and the internal surface of the second bearing seat 44.

A first adhesive 35 is applied 106 at the hidden interface between the second bearing 26 and the second bearing seat 44 by injecting adhesive through the aperture 48, for example using an appropriate adhesive injection nozzle inserted into the aperture 48, such that the first adhesive 35 flows into the first annular groove 34 of the second bearing 26. The first adhesive 35 is of a form which enables relative movement between the second bearing 26 and the second bearing seat 44 once injection of the first adhesive 35 has been completed.

In a presently preferred embodiment the first adhesive 35 used is a heat cured structural adhesive, and is the adhesive known as Loctite® 9492 available from Henkel Loctite. This may be particularly beneficial as the first adhesive 35 is located in the first annular groove 34 of the second bearing 26, between the second bearing 26 and the second bearing seat 44 of the frame 14, and hence is not visible. Curing of the first adhesive 35 may therefore prove difficult using, for example, a UV curing method, as it may prove difficult to ensure that the UV light can reach the first adhesive 35, and thus may prove difficult to fully cure the first adhesive 35. By using a heat cured adhesive it may be possible to ensure that the first adhesive 35 is fully cured, thereby ensuring a strong and reliable bond is formed.

A second adhesive 37 is applied 108 such that it contacts the second annular groove 36 and the second bearing seat 44 in the region of the cut-out 50. The second adhesive 37 is a quick UV curing adhesive, and in a presently preferred embodiment is the adhesive known as Loctite® 3556 available from Henkel Loctite. The second adhesive 37 is cured 110 by applying UV light with a wavelength of 365 nm for a period of 5 seconds. Following the curing 110 of the second adhesive 37, the first adhesive 35 is then cured 112 by placing the combined rotor assembly 12 and frame 14 in an oven at 80° C. for at least 20 minutes.

As the first adhesive 35 needs to be heat cured, which may take a relatively long period of time, there is a risk that the rotor assembly 12 and the frame 14 may become misaligned during the heat curing process itself, and indeed there is a risk that the rotor assembly 12 and the frame 14 may become misaligned during transportation of the components to an oven for the curing process to take place. This risk of misalignment can be mitigated by the application of the second adhesive 37 to form a quick, relatively low strength, bond between the rotor assembly 12 and the frame 14. The bond formed by the second adhesive 37 is sufficient to fix the rotor assembly 12 to the frame 14 at a desired position until the curing process 112 for the first adhesive 35 has been completed.

The combined rotor assembly 12 and frame 14 can be seen in FIGS. 2-5 and 9-10 as part of the electric motor 10. The stator core assemblies 52 are shown inserted into their respective slots 46 in FIGS. 2 and 9, and the rotor assembly 12 is mounted to the frame 14 such that the first 24 and second 26 bearings are located in their respective first 42 and second 44 bearing seats.

The first bearing 24 is soft-mounted to the first bearing seat 42 by the O-rings 32. Because the first bearing 24 is only soft mounted within the first bearing seat 42 by way of the O-rings 32, it is able to absorb any radial forces generated by the impeller 28 as it spins during use.

The second bearing 26 is mounted to the second bearing seat 44 by the first adhesive 35 injected into the first annular groove 34 through the aperture 48. As a result of the adhesive bond, the second bearing 26 is able to withstand axial forces along the rotor assembly 12 that are generated by the impeller 28 during use. The second bearing seat 44 defines a continuous surface about the circumference of the second bearing 26 in the region of the first annular groove 34, save for the aperture 48.

Figure 11:
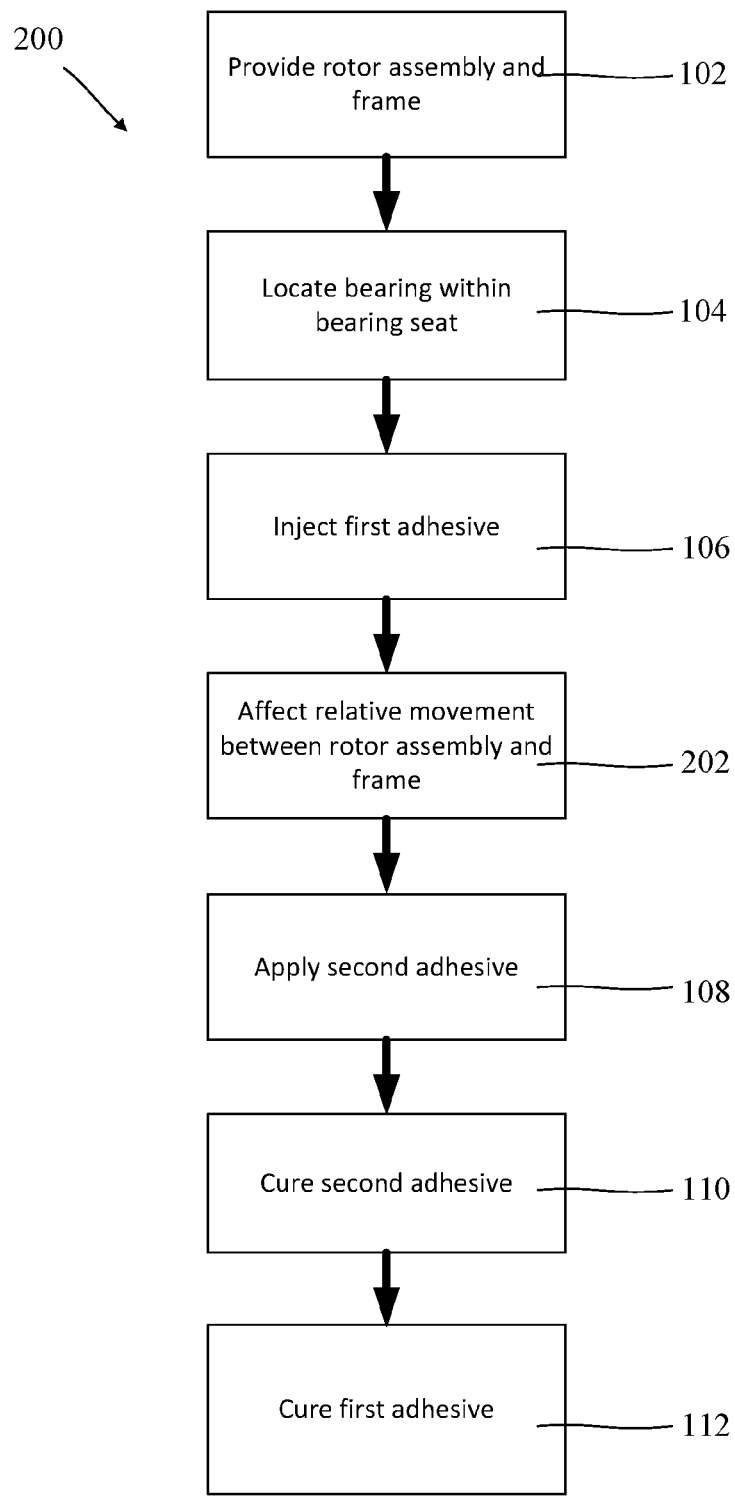
FIG. 11 is a block diagram of a second embodiment of a method of mounting a rotor assembly to a frame of an electric motor according to the first aspect of the present invention.

A second embodiment of a method of mounting the rotor assembly 12 to the frame 14 is shown in the block diagram of FIG. 11, and is generally designated 200.

The second embodiment of the method 200 is substantially the same as the first embodiment of the method 100, but comprises the additional step of affecting relative movement 202 between the second bearing 26 and the second bearing seat 44 prior to applying 108 the second adhesive 37.

This acts to spread the first adhesive 35 contained in the first annular groove 34 of the second bearing 26 along the interface between the second bearing 26 and the inner surface of the second bearing seat 44, thereby increasing the bond surface area, which may result in an increased strength of bond. By affecting relative movement 202 between the second bearing 26 and the second bearing seat 44, correct alignment of the rotor assembly 12 relative to the frame 14 can also be achieved. In presently preferred embodiments the rotor assembly 12 is moved relative to the frame 14, although it will be appreciated that moving the frame 14 relative to the rotor assembly 12 can achieve the same result. As can be seen most clearly in FIG. 9, the first annular groove 34 is misaligned with the aperture 48 as a result of relative movement between the second bearing 26 and the second bearing seat 44 during assembly.

The invention claimed is:

1. A method of mounting a rotor assembly to a frame of an electric motor, the method comprising:
   providing a rotor assembly having a bearing;
   providing a frame having a bearing seat;
   locating the bearing within the bearing seat, thereby forming a hidden interface between the bearing and the bearing seat, and a visible interface between the bearing and the bearing seat;
   applying a first adhesive at the hidden interface;
   applying a second adhesive at the visible interface; and
   curing the first and second adhesives using different curing processes.

2. The method of claim 1, wherein the bearing seat comprises an aperture, and applying the first adhesive comprises injecting the first adhesive through the aperture to the hidden interface.

3. The method of claim 1, wherein the method comprises curing the first adhesive subsequent to curing the second adhesive.

4. The method of claim 1, wherein the bearing or the bearing seat comprises a first annular groove, and applying the first adhesive comprises applying the first adhesive in the first annular groove.

5. The method of claim 1, wherein the first adhesive comprises a different adhesive to the second adhesive.

6. The method of claim 1, wherein curing the first adhesive comprises using a heat curing process.

7. The method of claim 1, wherein curing the second adhesive comprises using a UV curing process.

8. The method of claim 1, wherein the bearing comprises a second groove, and the bearing seat comprises a cut-out, at least a portion of the second groove is exposed through the cut-out, and applying the second adhesive comprises applying the second adhesive such that the second adhesive contacts the second groove and at least a portion of the external surface of the bearing seat in the region of the cut-out.

9. The method of claim 1, wherein the method comprises affecting relative movement between the bearing and the bearing seat prior to applying the second adhesive, and subsequent to applying the first adhesive.

10. An electric motor comprising a rotor assembly having a bearing, and a frame having a bearing seat for receiving the bearing, wherein the bearing is mounted to the bearing seat by a first adhesive at a hidden interface between the bearing and the bearing seat and by a second adhesive at a visible interface between the bearing and the bearing seat, the first and second adhesives having been cured using different curing processes.

11. The electric motor of claim 10, wherein the bearing seat comprises an aperture through which the first adhesive is injected.

12. The electric motor of claim 10, wherein the bearing an internal surface of the bearing seat comprises a first annular groove, the first annular groove defines at least a portion of the hidden interface, and the first adhesive is located in the first annular groove.

13. The electric motor of claim 10, wherein the bearing seat comprises a cut-out, at least a portion of the bearing is visible through the cut-out, and the cut-out defines the visible interface between the bearing and the bearing seat.

14. The electric motor of claim 13, wherein the bearing comprises a second groove, at least a portion of the second groove is exposed through the cut-out, and the second adhesive is located in the second groove.

15. The electric motor of claim 10, wherein the first adhesive comprises a different adhesive to the second adhesive.

16. The electric motor of claim 10, wherein the second adhesive comprises an adhesive having a shorter cure time than that of the first adhesive.

17. The electric motor of claim 10, wherein the first adhesive comprises a heat cured adhesive.

18. The electric motor of claim 10, wherein the second adhesive comprises a UV cured adhesive.

* * * * *